(12) United States Patent
Fennel et al.

(10) Patent No.: US 6,614,343 B1
(45) Date of Patent: Sep. 2, 2003

(54) METHOD FOR DETERMINING VEHICLE STATUS VARIABLES

(75) Inventors: Helmut Fennel, Bad Soden (DE); Michael Latarnik, deceased, late of Friedrichsdorf (DE), by Christine Latarnik, Sylvia Monika Latarnik, Eva-Maria Latarnik, legal representatives

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/529,142

(22) PCT Filed: Oct. 9, 1998

(86) PCT No.: PCT/EP98/06417
§ 371 (c)(1),
(2), (4) Date: May 11, 2001

(87) PCT Pub. No.: WO99/19192
PCT Pub. Date: Apr. 22, 1999

(30) Foreign Application Priority Data

Oct. 10, 1998 (DE) .......................................... 197 44 725

(51) Int. Cl.$^7$ ................................................ B60Q 1/00
(52) U.S. Cl. .................... 340/425.5; 340/429; 340/438; 340/440; 340/441; 701/1; 701/41
(58) Field of Search ............................ 340/425.5, 426, 340/429, 438, 440, 441; 701/1, 38, 72, 41

(56) References Cited

U.S. PATENT DOCUMENTS

| | | | | |
|---|---|---|---|---|
| 4,418,852 A | * | 12/1983 | Grinwald | 224/42.23 |
| 4,570,691 A | * | 2/1986 | Martus | 152/332.1 |
| 4,951,199 A | * | 8/1990 | Whitehead | 701/41 |
| 5,253,728 A | * | 10/1993 | Matsuno et al. | 180/140 |
| 5,388,046 A | * | 2/1995 | Anan et al. | 701/91 |
| 5,388,895 A | * | 2/1995 | Negrin | 303/154 |
| 5,694,319 A | * | 12/1997 | Suissa et al. | 701/41 |
| 5,946,797 A | * | 9/1999 | Kawabe et al. | 29/821 |
| 6,338,270 B1 | * | 1/2002 | Mancosu et al. | 73/146 |
| 6,438,464 B1 | * | 8/2002 | Woywod et al. | 701/1 |

FOREIGN PATENT DOCUMENTS

| | | |
|---|---|---|
| DE | 39 37 966 | 5/1991 |
| DE | 42 08 404 | 9/1992 |
| DE | 42 34 819 | 4/1993 |
| DE | 42 00 061 | 7/1993 |
| DE | 44 30 458 | 2/1996 |
| DE | 195 27 531 | 2/1996 |
| DE | 44 35 160 | 4/1996 |
| DE | 196 49 137 | 6/1997 |
| DE | 196 07 050 | 8/1997 |
| DE | 196 21 320 | 12/1997 |
| DE | 196 23 595 | 12/1997 |
| EP | 0 444 109 | 9/1991 |
| EP | 0 788 955 | 8/1997 |
| JP | 4 235312 | 8/1992 |

* cited by examiner

Primary Examiner—Daryl Pope
(74) Attorney, Agent, or Firm—Rader, Fishman & Grauer PLLC

(57) ABSTRACT

In a method for determining vehicle status quantities on the basis of the forces acting on the individual wheel and detected by means of tire sensors, where the measured quantities represent the longitudinal and lateral tire forces as well as the vertical tire forces, the angular yaw velocity and acceleration, the steering angle, the side slip angle of the vehicle as well as the vehicle velocity and acceleration are established by inclusion of corrective quantities established, estimated and/or calculated in corrective step. By means of the corrective steps, the quantities dependent on wheel forces, intermediate quantities, or components are weighted in dependence on further measured quantities which have been established by conventional sensor devices, etc., and/or which represent the vehicle situation.

7 Claims, 4 Drawing Sheets

METHOD FOR DETERMINING VEHICLE STATUS VARIABLES

TECHNICAL FIELD

The invention generally relates to vehicle control, and more particularly relates to a method for determining vehicle status quantities which are needed in particular to realize or enhance automotive-vehicle control systems.

BACKGROUND OF THE INVENTION

From European Patent EP 444 109 B1, a method for controlling the movement of an automotive vehicle is known that is based on the detection of tire prints. Beside tire sensors which detect the tire contact patch, still other sensors are used to detect wheel speeds, angle of turn, position of the wheel suspension, acceleration of the center of gravity, etc. This known control method provides that, by means of the tire print sensors, forces and moments are measured which act on the individual tires. These measuring results are, along with the information delivered by the other sensors, used to control the movement of the automotive vehicle. The method is provided in particular for vehicles on which all wheels can be propelled and steered.

DE 39 37 966 C2 sets forth a method for determining of the friction force conditions between vehicle wheel and road, in which method the deformations occurring in the vehicle tire in horizontal and in normal direction while passing the tire contact patch are detected and are evaluated for determining the forces acting on the tires. The friction coefficient is then determined from the ration between the horizontal force and the normal force.

The present invention determines, on the basis of various tire sensors, vehicle status quantities that are utilizable in particular for automotive-vehicle control systems with the precision and reliability required by such systems.

The present invention fulfills the objects of the present invention in that, on the basis of measured quantities that are obtained by means of tire force sensors and that reflect tire longitudinal and lateral forces as well as tire vertical forces, the methods of the present invention obtain the yaw rate and/or acceleration, the steering angle and the side slip angle of the automotive vehicle as well as the vehicle velocity and vehicle acceleration are obtained under consideration of correction quantities.

The method according to the present invention for the determination of vehicle status quantities and a control founded thereon, is thus based on the moments and forces occurring directly at the tire. By this means already, all influencing quantities are detected, and misinterpretations that go back to ambiguous sensor signals or processing errors are avoided or impeded. By consideration of corrective quantities, the safety and reliability of the determination of vehicle status quantities and the consideration of the respective driving situation are still significantly increased or improved, respectively.

According to an advantageous embodiment of the invention, the tire-force dependent quantities obtained by means of tire sensors, the intermediate quantities, and the components of these quantities are weighted in the corrective steps in dependence on further measured quantities that, e.g., are established by means of conventional sensors, such as wheel velocity sensors etc., and/or on quantities which reflect the momentary driving situation (such as cornering, driving straight, friction coefficient, etc.). According to the invention, additional quantities depending on engine torques, engine speed, transmission gear, etc., can be detected and evaluated for weighting the vehicle status quantities. Thereby, for instance, a very extensive, very precise adaptation of the control to very different situations can be achieved. Furthermore, the error safety and the timely recognition of possible defects is enhanced.

According to a further embodiment of the invention, the vehicle status quantities or components of these quantities are weighted in separate corrective steps as the quantities determined by the tire sensors are combined with respective quantities determined by conventional sensor devices and/or by the current driving situation and by further processing these combined quantities as corrected measured quantities. Here, it has been found useful to obtain and evaluate the angular yaw velocity, the longitudinal component of the vehicle velocity and the lateral component of the vehicle velocity in separate corrective steps.

DETAILED DESCRIPTION OF THE PREFERRED EMBODIMENTS

Figures 1, 2:
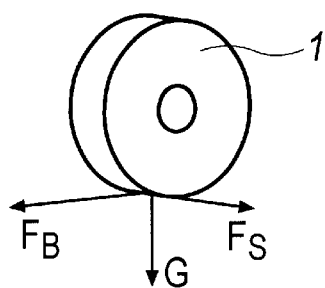
FIG. 1 shows, in symbolically simplified, perspectival depiction, a vehicle tire and the forces acting on the contact patch.
FIG. 2 schematically shows the view on a vehicle.

The method according to the invention is based on the use of tire sensors by which the forces exerted on the tires and transmitted to the road are measured. In FIG. 1 are symbolically depicted the force components occurring at the contact patch of a tire and measured with tire force sensors. $F_B$ refers to the lateral tire force, and G to the vertical tire force. These forces are detected and evaluated individually for each wheel 1 to 4. The subscript characters i (i=1 . . . 4) indicate the individual wheels; corresponding to the symbolic depiction in FIG. 2, usually the left front wheel is referred to by subscript 1, the right front wheel by 2, the right rear wheel by 3, and the left rear wheel by 4.

From FIG. 2, it can also be gathered the definition of the remaining physical quantities that are used here. Of special interest are the tire slip angles $\alpha_i$ where the subscript I refers to the respective wheel, and the side slip angle $\beta$ which is a measure for the stability of the momentary driving status and thus expresses the deviation from the longitudinal vehicle direction. $\psi$ refers to the yaw angle, $\delta$ to the steering angle. The distance of the center of vehicle gravity from the front axle is referred to by $1_v$, the distance of this center of gravity from the center of the rear axle by $1_H$. The track width is named $S_w$.

In the figures and in the following explanations, a dot positioned above the symbol refers to the first time derivative of a physical quantity, two dots to the second time derivative.

On the basis of the longitudinal and lateral forces $F_{B1} \ldots F_{B4}$, $F_{S1}, \ldots F_{S4}$ and of the vertical forces $G_1 \ldots G_4$, the following vehicle quantities are detected:

$v_x, \dot{v}_x$ = Velocity, acceleration of the vehicle in longitudinal direction;

$v_y, \dot{v}_y$ = Velocity or acceleration, respectively, of the vehicle in longitudinal direction;

$\alpha_i$ = Slip angle for wheel i;

$\beta$ = Slide slip angle;

$\psi$ = Angular yaw velocity;

$\delta$ = Steering angle.

Figure 3:
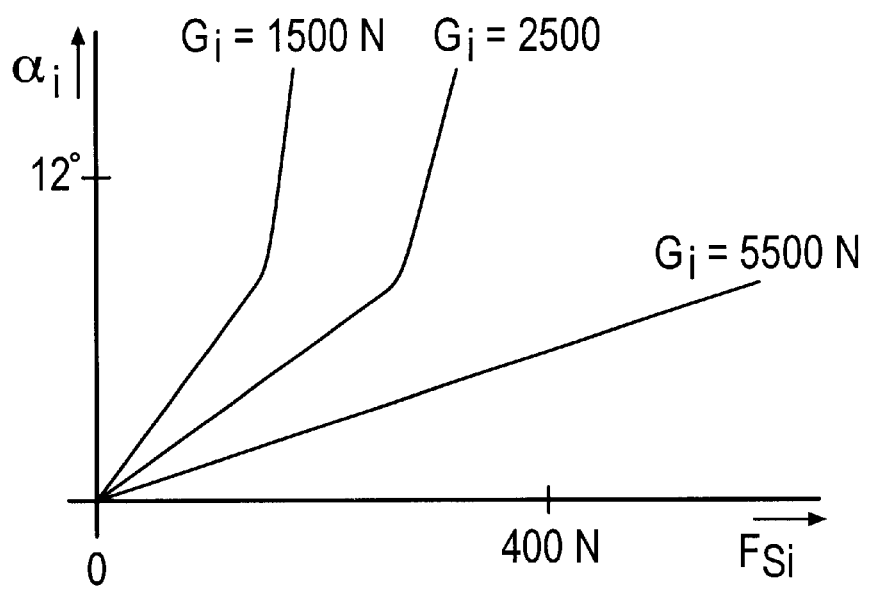
FIG. 3 shows, in a diagram, the dependence of the slip angle of a wheel on the lateral force and the vertical force of a tire.

FIG. 3 illustrates the dependence of the slip angle $\alpha_i$, of a vehicle wheel, i.e. the wheel i, on the lateral tire force $F_{si}$ acting on the respective wheel. As a parameter of the depicted curves, the respective vertical force $G_i$ is noted. At a relatively minor vertical force (e.g. of 1,500 N), already a relatively minor lateral tire force results in a high slip angle aci, while, for instance, at a high vertical force $G_i$=5,000 N, the slip angle caused by a specific lateral tire force is a lot lesser. High vertical forces also have a favorable effect on the driving stability of a vehicle. At a relatively minor vertical force of the wheels, already a comparatively minor lateral tire force results in a high slip angle $\alpha_i$.

Figure 4:
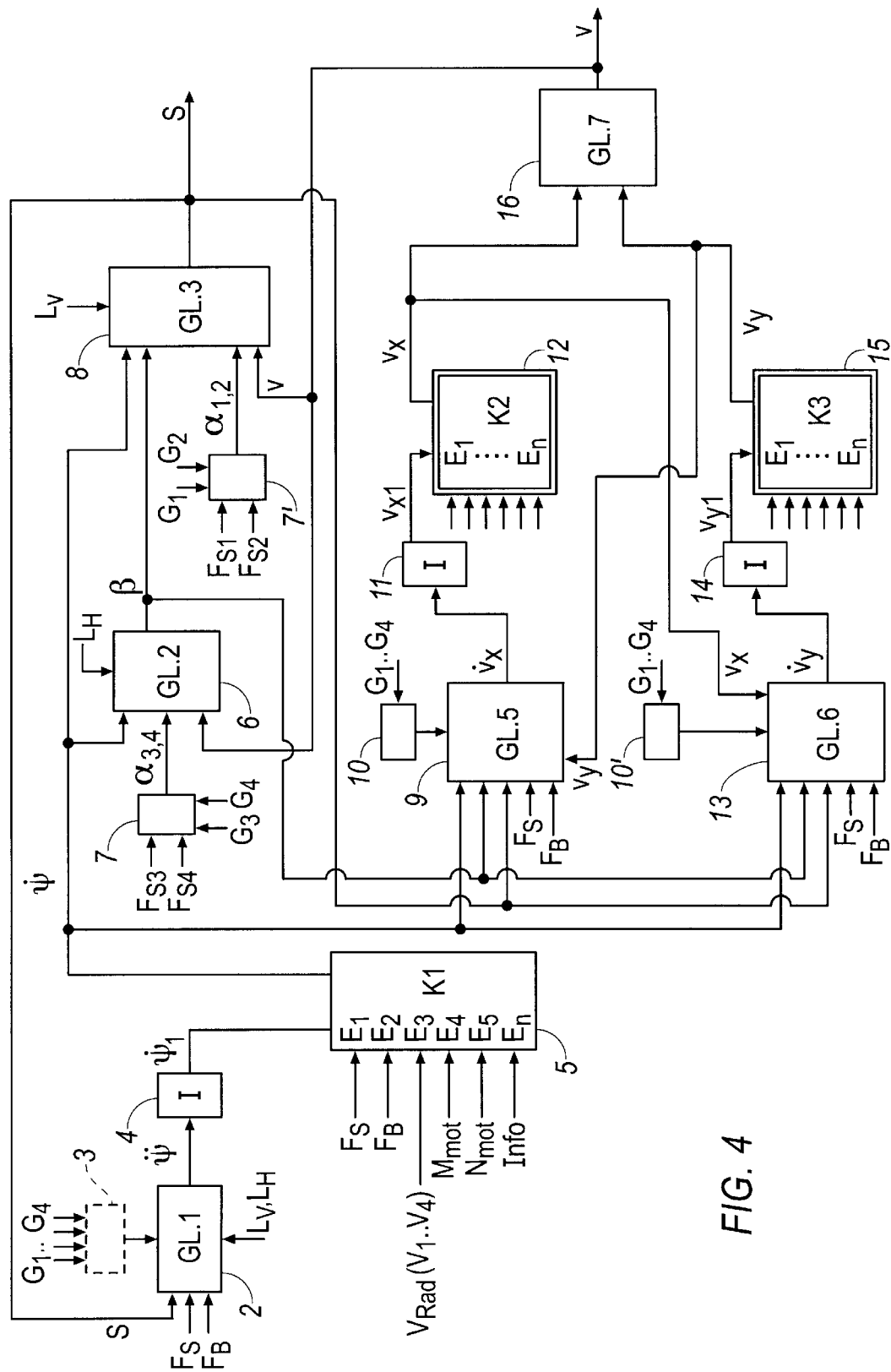
FIG. 4 shows, in a block diagram or functional illustration, the most important components of an embodiment of a circuitry arrangement for performing the method according to the invention.

The block diagram or functional illustration according to FIG. 4 contains an input circuitry 2 in which the angular yaw acceleration $\dot{\psi}$ is calculated according to an equation (1). To this end, the necessary input quantities $F_{Si}$, $F_{Bi}$, the steering angle $\delta$, and the inertia moment J are supplied as indicated by the arrows pointing to circuitry 2 in which the calculation according to equation (1) occurs. This inertia moment J is either predetermined as a constant depending on the vehicle construction, or it is calculated on the basis of the vertical forces $G_i$ through $G_4$, where a mass distribution model, symbolized by the dotted-line block 3, can be applied. Additionally, as can be gathered from the signal arrows leading to block 2, the distance $1_V$ of the center of vehicle gravity from the center of the front axle (V) as well as the distance $1_H$ of this center of gravity from the center of the rear axle (H) are required as input quantities.

For simplicity purposes, the present contemplations and calculations are limited to one plane for vehicle, driving, and road. For an even more precise detection and analysis of the events, also the roll angle or the pitch of the vehicle or the vertical movement, respectively, could in principle be included in the calculations in the same way.

For processing the input signals in circuitry 2, the following applies (equation 1):

$$J\dot{\psi}=-F_{SV}1_V \cos \delta - F_{BV}1_V \sin \delta + F_{SH}1^H + 0.5(F_{S2}-F_{S1})S_W \sin \delta + (F_{B4}-F_{B3})S_W/2 + 0.5(F_{B1}-F_{B2})S_W \cos \delta \quad (1)$$

The individual quantities in this equation (1) are as follows:

$$F_{SV} = F_{S1} + F_{S2}; \quad F_{SH} = F_{S3} + F_{S4};$$

$$F_{BV} = F_{B1} + F_{B2}; \quad F_{BH} = F_{B3} + F_{B4};$$

$$F_S = F_{SV} + F_{SH};$$

"Sw" means "track width".

From the angular yaw acceleration $\dot{\psi}$, the angular yaw velocity $\psi$ is obtained through an integration operator 4 according to FIG. 4. After correction aided by a circuitry 5 (corrective step K1), whose way of operation and meaning will be described subsequently by means of FIG. 5, a signal representing the angular yaw velocity $\psi$ is available at the output port of this corrective step. $\psi$ is therefore a corrected quantity which was obtained from the angular yaw velocity $\psi_1$ derived from the tire forces under consideration of initial values and corrective values of different kinds as subsequently explained in closer detail by means of FIG. 5.

Also conceivable would be a renunciation of this correction in circuitry 5 if the appearance of faulty measurements or false interpretations possible in particularly unfavorable situations could be prevented of if the appearance of such errors could be recognized with certainty.

In a circuitry or step 6, now the side slip angle $\beta$ is calculated from the angular yaw velocity $\psi$ under consideration of the slip angle $\alpha_3$, $\alpha_4$ of the rear wheels and of the vehicle velocity v. The distance $1_H$ of the center of gravity from the center of the rear axle and the track width must also be known for this purpose. The slip angles $\alpha_3$, $\alpha_4$ of the rear wheels are determined with the help of a circuitry 7 or by corresponding algorithms or program steps (see also FIG. 3), respectively, from the lateral tire forces $F_{S3}$, $F_{S4}$ and the vertical forces $G_3$, $G_4$, according to the relation (equation 2):

$$\beta = \dot{\psi}L_H'/v - (\alpha_3+\alpha_4)/2 \text{ with } L_H'=(1_H^2+\tfrac{1}{4}S_W^2)^{1/2} \quad (2)$$

the slip angles $\alpha_1$, $\alpha_2$ of the front wheels are likewise established from the respective lateral tire forces $F_{S1}$, $F_{S2}$.

The side slip angle velocity $\dot{\beta}$, the steering angle $\delta$ the angular yaw velocity $\dot{\psi}$, the lateral velocity, and the longitudinal tire forces $F_{Bi}$ as well as the lateral tire forces $F_{Si}$ determine the longitudinal component of the vehicle acceleration $\dot{v}_x$, with the mass m being calculated and evaluated from the vertical forces $G_1$ through $G_4$, according to the relation (equation 4):

$$M=(G_1+G_2+G_3+G_4)/g \quad (4)$$

A circuitry 9 symbolizes the computing events for determining the longitudinal component $\dot{v}_x$ of the vehicle acceleration according to the relation (equation 5):

$$\dot{v}_x=1/m(F_{SV} \sin \delta - F_{BV} \cos \delta - F_{BH}) + v_y(\dot{\psi}+\dot{\beta}) \quad (5)$$

After integration in a block 11 and correction in a circuitry 12 (corrective step K2), the corrected longitudinal component of the vehicle velocity $v_x$, is obtained from the longitudinal velocity $v_{x1}$.

The lateral component $\dot{v}_y$ of the vehicle acceleration is, by analogy with the longitudinal component $\dot{v}_x$, obtained with the help of a circuitry 13 in which the lateral component $\dot{v}_y$ is determined according to the following relation (equation 6):

$$\dot{v}_y=1/m(-F_{SV} \cos \delta - F_{BV} \sin \delta - F_{SH}) + v_x(\dot{\psi}+\dot{\beta}) \quad (6)$$

This is again followed by an integration in block 14 which leads to the establishment of the lateral vehicle velocity $v_{y1}$. For the correction (K3) is provided a circuitry 15 at whose output port the lateral component $v_y$ of the vehicle velocity is available. Finally, the two components $V_x$, $v_y$ are combined in a circuitry depicted as block 16 in which the vehicle velocity v is obtained from the sum of the squares of both components based on an equation (7):

$$V=(v_x^2+v_y^2)^{1/2} \quad (7)$$

The corrections in corrective step K2 and/or in corrective step K3 are, like the corrections in K1, possibly unnecessary or can be established independently of the momentary values of the longitudinal and lateral velocity components $v_x$ and $v_y$, respectively.

FIG. 5 serves for the explanation of the principal way of operation of the corrective steps K1, K2, and K3 of the circuitry arrangement according to FIG. 4. In their principal way of operation and their structure, the three steps are equal, as also follows from the following. Of course, such circuitries are realized by program steps or program sections when program-controlled circuitries are used.

Figure 5A:
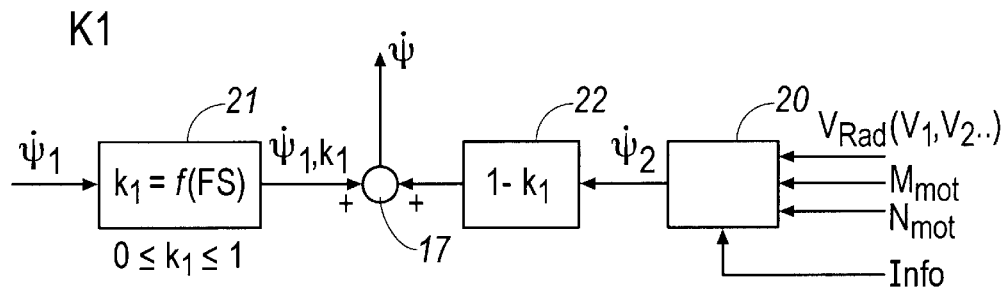
FIGS. 5 $a$) through $c$) show, in symbolic depiction, components and input quantities of the corrective steps of the circuitry according to FIG. 4.

In step K1, shown in FIG. 5a, the angular yaw velocity $\dot{\psi}$ is basically obtained according to the relation:

$$\dot{\psi}(t_n) = f_\psi[\dot{\psi}_1(t_n), \dot{\psi}_2(t_n)] \tag{8}$$

In this formula, $t_n$ stands for the regarded point in time or the studied point in time, the component $\dot{\psi}_1(t_n)$ for the angular yaw velocity obtained at the point in time n on the basis of the measured tire forces. The component $\dot{\psi}_2(t_n)$ refers to the influential and corrective quantities obtained and calculated on the basis of the conventional wheel sensor devices, aided by engine torque sensors, engine speed sensors, etc. Also other pieces of information available in the system can additionally be evaluated, i.e. be considered during establishment of the component $\dot{\psi}_2(t_n)$. Such additional pieces of information are, for instance supplied through internal bus connections to which also other automotive control systems and sensors are connected. The currently selected gear is an example for a further influential quantity.

FIG. 5a illustrates the interaction of the individual influential and corrective quantities. In a summer 17, the component $\dot{\psi}_1 k_1$, derived from the tire forces and weighted, and the, likewise weighted, component $\dot{\psi}_2(1-k1)$ are added.

The components of the angular yaw velocity are corrected in the working or processing beat.

According to equation (9), this applies:

$$\dot{\psi}_1(t_{n+1}) = \dot{\psi}(t_n) + \int_{t_n}^{t_{n+1}} \ddot{\psi}\, dt \tag{9}$$

In principle, the best current measurement and estimate of the angular yaw velocity is the basis for the next computing step (n+1) as an initial value.

The momentarily existing pieces of information, derived from the conventional sensor devices and from the other sources, e.g. made available through the bus connection, and weighted according to situation, vehicle type, type of propulsion, etc., are contained in the quantity $\dot{\psi}$. For example, for a vehicle with front wheel drive, this applies:

$$\dot{\psi}_2(t_n) = (v_3 - v_4)/S_W * 1/(1 + v^2/v_{CH}^2) \tag{10}$$

For a vehicle with rear wheel drive, however, this applies:

$$\dot{\psi}_2(t_n) = (v_2 - v_1)/(S_W \cos \delta) * 1/(1 + v^2/v_{CH}^2) \tag{11}$$

with $$\delta = (v_1 - v_2)(1_v + 1_H)/S_W v_{CH}^2 = (1_v + 1_H)^2 c_V c_H/m(c_H 1_H - c_V 1_v) \tag{12}$$

In these formulas, $c_V$, $c_H$ are the lateral-force slip-angle coefficients for the front wheels (V) and for the rear wheels (H).

The influence of the quantities derived from the conventional sensor devices and the remaining pieces of information on the control events is corrected either by a constant value $k_1$ or by a variable value $[k_1 = f(FS)]$ which depends on the driving situation, wherein principally a correction of the measured values or a compensation of the missing or of the relatively uncertain pieces of information occurs by means of other findings derived from conventional sensor devices and/or from the remaining sources of information.

This applies accordingly to the corrective steps K2, K3. In the corrective step K2 according to FIG. 5b, the longitudinal vehicle velocity is obtained in principle in the same manner as in step K1, according to the relation:

$$V_x(t_n) = f_{vx}[V_{x1}(t_n), V_{x2}(t_n)], \tag{13}$$

where again the component $v_{x1}(t_n)$ refers to the pieces of information obtained on the basis of the measured tire forces, and $v_{x2}(t_n)$ contains and processes the ones obtained from the conventional sensor devices, in particular wheel sensors, and taken from other sources, for example supplied through the bus connection.

Again, the control is based on the current, i.e. momentarily best, value obtained by measuring, estimating, approximating, etc. according to the relation $$v_{x1}(t_{n+1}) = v_x(t_n) + \int_{t_n}^{t_{n+1}} \dot{v}_x\, dt \tag{14}$$

In a specific situation, for instance, this could apply:

$$v_{x2}(t_n) = v_{REF,ABS} \tag{15}$$

In this case, the quantity $v_{REF,ABS}$ would be the vehicle reference velocity made available by an anti-lock brake system (ABS) and calculated there. For the function fvx then this applies:

$$f_{vx}[v_{x1}, v_{x2}] = k_2 v_{x1} + (1 - k_2) v_{x2} 0 \leq k_2 \leq 1$$

In this case, $k_2$ is a constant or a function of the driving situation; for example, $k_2$ equals 0 or approaches 0, when a stable driving situation has been recognized; such a stable situation prevails, for example, under the following conditions:

Straight ride ($F_S \approx 0$; $v_1, v_2, v_3, v_4$ are approximately equal)
The engine torque is fully employed for traction:

$$M_{mot} = 2i_s F_{B,left} = 2i_s F_{B,right} \tag{16}$$

with $i_s$ = gear transmission factor

Depending on the situation and measuring data available, also other criteria can be evaluated as hint on a stable driving situation.

Figure 5B:
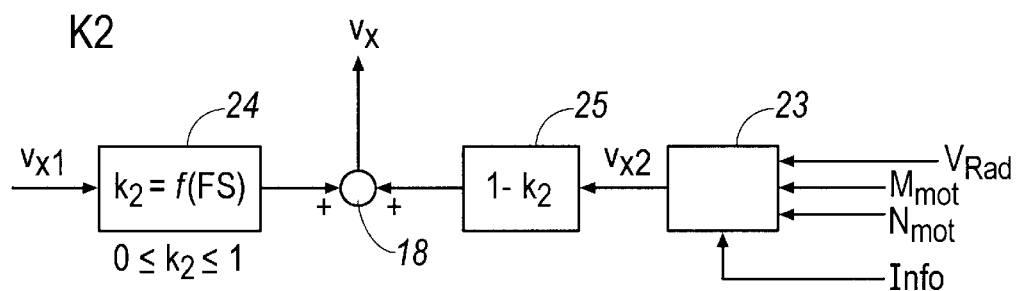
Figure 5C:
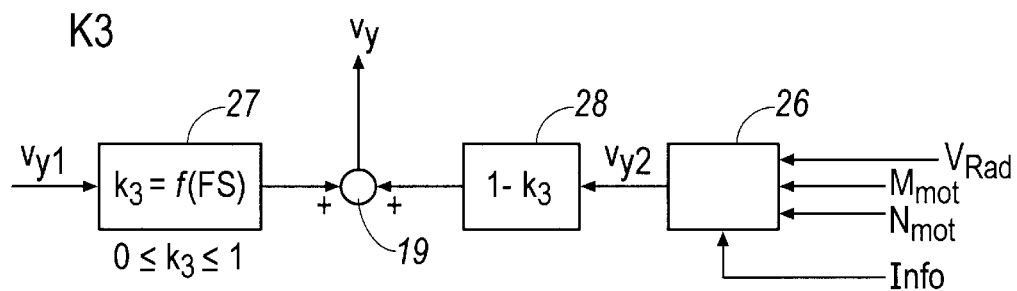

FIG. 5c, showing the corrective step K3, serves for the derivation of the lateral vehicle velocity $v_y(t_n)$. In analogy with the calculation of the longitudinal vehicle velocity described above, for the lateral vehicle velocity generally the following relation applies:

$$v_y(t_n) = f_{vy}[v_{y1}(t_n), v_{y2}(t_n)] \tag{17},$$

where, according to the correlations described in connection with corrective circuitry K2, the component $v_{y1}$ of this relation represents the lateral vehicle velocity obtained on the basis of the measured tire forces. $V_{y2}$ is again the component dependent on the remaining pieces of information; the explanation given above in connection with the calculation of the longitudinal component $v_{x2}$ applies accordingly.

For the continuous calculation and update of the results, this applies:

$$v_{yl}(t_{n+q}) = v_y(t_n) + \int_{tn}^{tn+1} \dot{v}_y \, dt$$

Consequently, it follows:

$$f_{vy}[v_{y1}, v_{y2}] = k_3 v_{y1} + (1-k_3) v_{y2} \; 0 \leq k_3 \leq 1 \quad (19)$$

In this case, $k_3$ is also a constant or a function of the driving situation which is obtained in the manner described above.

Back to the embodiment of FIG. 5a: The component $\dot{\psi}_2$ is calculated according to FIG. 5a by means of a circuitry or a function 20 which is realized by programming, where the calculations are carried out on the basis of pieces of information and signals which have been obtained with conventional speed sensors and/or other known sources of information and sensors. In FIG. 5a, as an example for input quantities, the current engine torque $M_{mot}$, the rotary engine speed $N_{mot}$, the specific conditions for the transfer of the engine torque to the street (e.g. the selected gear), and other circumstances—symbolized by the input arrow "Info"—which influence the effect of the engine torque on the rotary wheel behavior, are indicated. These are important quantities for the detection of the momentary dynamic status of the vehicle.

During a straight ride of the vehicle, during which the lateral forces are small by nature, during cornering, at high and low friction coefficients, on homogeneous and inhomogeneous road, at low and high speeds, etc., different driving situations arise which possess a great influence on the validity of the vehicle status quantities obtained through the tire sensor devices in comparison with the compensating quantities. It is therefore suitable to weight the component $\dot{\psi}_1$ derived from the tire sensor devices and the component $\dot{\psi}_2$ obtained with conventional wheel sensors etc. depending on the different driving situations. This occurs, according to FIG. 5a in the circuitries or program steps 21, 22. An approximation of $k_1$ toward the value 1 indicates a high influence or a high dependence of the control events, respectively, on the values measured with the tire sensor devices, while a small value of $k_1$, e.g. $k_1=0$ or near 0, indicates an extensive dependence of the control on the corrective and compensating values obtained in a different way.

For the mode of operation of the corrective steps K2 (FIG. 5b) and K3 (FIG. 5c), which comprise the circuitries 23–25 and 26–28, the same applies in principle as for the corrective step K1 described by means of FIG. 5a. The velocity components $v_{x1}$ and $v_{y1}$ obtained by the circuitry arrangement according to FIG. 4 and extensively, but for the correction in K1, depending on the values measured by the tire sensor devices, are weighted by means of the corrective steps and circuitries according to FIGS. 5b and 5c in dependence on the quantities $v_{x2}$ and $v_{y2}$ and on the factors $k_2$ and $k_3$. The quantities $v_{x2}$ and $v_{y2}$ again depend on various quantities, e.g. wheel sensor signals, driving situation, and the influences described above, of on rigidly pre-set quantities. Therefore, the weighting of the components originating from the various sources and computing methods is, in the same manner as described by means of FIG. 5a, dependent on the driving situation and accuracy or reliability, respectively.

According to FIG. 5a, the weighted quantities are combined in the summer 17, in FIGS. 5b and 5c in the summers 18 and 19.

On the basis of the vehicle status quantities established with the method according to the invention, the initially mentioned automotive control systems and also others can be distinctly improved. Since the control quantities can be directly derived from the vehicle wheels, and since thus the quantity or quantities to be controlled are detected first hand, the danger of false interpretation and falsifications during the information-processing event is comparatively small. This certainty is still distinctly improved by the observation and correlation with the pieces of information gained in the conventional way—this happens in the corrective steps K1 to K3—so that even extreme conditions are detected and malfuinctions are recognized immediately. It can be expected that the total effort required for the complete control system is comparatively small.

What is claimed is:

1. A method for detemining vehicle status quantities, in which the forces acting on the individual wheels and tires are measured and evaluated for the establishment of control quantities for an automotive control system, comprising the steps of:

measuring tire force quantities including longitudinal and lateral tire forces, vertical tire forces of the wheels, establishing vehicle status quantities including the angular yaw velocity or the angular yaw acceleration, the steering angle and the side slip angle of the vehicle as well as the vehicle velocity or the vehicle acceleration by using corrective quantities determined, estimated or calculated in corrective steps, weighting the tire force quantities or components of these quantities in the corrective steps in dependence on at least one of the following measured, or calculated non-tire force quantities rotary wheel speed, cornering, straight ride, friction coefficient.

2. A method according to claim 1, further including measuring or deriving at least one of the following quantities, engine torques, the engine speed, or the transmission gear, and weighting the vehicle status quantities or the components of these quantities.

3. A method according to claim 2, wherein the vehicle status quantities or components of these quantities are weighted in by first factors separate corrective steps which are independent of each other, whereby the vehicle status quantities, weighted in separate corrective step are combined with corresponding vehicle status quantities from other weighted corrective steps, and wherein the combine quantities are further processed as corrected quantities.

4. A method according to claim 3, wherein vehicle status quantities weighted on separate, corrective steps are weighted by second factors and that the weighted quantities are combined to create the vehicle status quantities.

5. A method according to claim 1, wherein the angular yaw velocity of the vehicle, the longitudinal component of the vehicle velocity, and the lateral component of the vehicle velocity are weighted by first factors in separate corrective steps and are summed with at least one measured, non-tire force quantity and the summation thereof is weighted, for the creation of the vehicle status quantities.

6. A method according to claim 3, wherein, for determining the vehicle status quantities the vehicle status quantities established on the basis of the tire force quantities are updated in a series of steps by correlation with the current non-tire force quantities, according to the equations:

$$\psi_1(t_{n+1}) = \psi(t_n) + \int_{t_n}^{t_{n+1}} \psi \, dt$$

or, respectively, $$v_{xI(yI)}(t_{n+1}) = v_{x(y)}(t_n) + \int_{t_n}^{t_{n+1}} v_{x(y)} \, dt$$

with $$\psi(t_n) = f\psi[\psi_1(t_n), \psi_2(t_n)]$$

or, respectively, $$V_{x(y)}(t_n) = f_{Vx(y)}[v_{x1(y1)}(t_n), v_{x2(y2)}(t_n)],$$

wherein the components $\psi_1(t_n)$, $v_{x1(y1)}(t_n)$ are established on the basis of the measured tire force quantities, and the components $\psi_2(t_n)$, $v_{x2(y2)}(t_n)$ are established by means of the measured, non-tire force quantities.

7. A method according to claim 6, wherein the quantities $\psi_1(t_{n+1})$, $v_{x1}(t_{n+1})$, $v_{y1}(t_{n+1})$ established on the basis of the tire forces are used as for calculating calculated and evaluated by a current estimate based on the momentary, current status quantities $\psi(t_n)$, $v_x(t_n)$, $v_y(t_n)$, as initial values for the next computing step.

* * * * *

UNITED STATES PATENT AND TRADEMARK OFFICE
CERTIFICATE OF CORRECTION

PATENT NO. : 6,614,343 B1
DATED : September 2, 2003
INVENTOR(S) : Fennel et al.

It is certified that error appears in the above-identified patent and that said Letters Patent is hereby corrected as shown below:

Column 8,
Line 54, change "and wherein the combine" to -- and wherein the combined --.

Signed and Sealed this

Ninth Day of December, 2003

JAMES E. ROGAN
*Director of the United States Patent and Trademark Office*